(12) United States Patent
Kim et al.

(10) Patent No.: US 10,587,003 B2
(45) Date of Patent: Mar. 10, 2020

(54) RECHARGEABLE LITHIUM BATTERY

(71) Applicant: SAMSUNG SDI CO., LTD., Yongin-si, Gyeonggi-do (KR)

(72) Inventors: Sanghyun Kim, Yongin-si (KR); Jeongchull Ahn, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 118 days.

(21) Appl. No.: 15/710,084

(22) Filed: Sep. 20, 2017

(65) Prior Publication Data

US 2018/0083311 A1  Mar. 22, 2018

(30) Foreign Application Priority Data

Sep. 21, 2016 (KR) .......... 10-2016-0120643

(51) Int. Cl.
H01M 10/0525 (2010.01)
H01M 10/613 (2014.01)
H01M 10/658 (2014.01)
H01M 2/02 (2006.01)

(52) U.S. Cl.
CPC ....... H01M 10/0525 (2013.01); H01M 2/021 (2013.01); H01M 2/0267 (2013.01); H01M 10/613 (2015.04); H01M 10/658 (2015.04)

(58) Field of Classification Search
None
See application file for complete search history.

(56) References Cited

U.S. PATENT DOCUMENTS

| 2006/0251962 | A1* | 11/2006 | Kim ............... H01M 2/1653 429/130 |
| 2011/0117399 | A1 | 5/2011 | Ahn et al. |
| 2011/0217589 | A1* | 9/2011 | Kobayashi ........ H01M 2/02 429/174 |
| 2011/0244318 | A1* | 10/2011 | Cho ............... H01M 2/0207 429/186 |
| 2012/0034513 | A1 | 2/2012 | Kim |
| 2012/0115025 | A1 | 5/2012 | Kim et al. |
| 2016/0043361 | A1 | 2/2016 | Bao et al. |
| 2017/0346130 | A1* | 11/2017 | Maeda ........... H01M 10/052 |

FOREIGN PATENT DOCUMENTS

| CN | 102195075 A | 9/2011 |
| CN | 102214813 A | 10/2011 |
| EP | 2 822 058 A1 | 1/2015 |
| JP | 2007-154135 A | 6/2007 |
| JP | 5298077 B2 | 6/2013 |
| KR | 10-2011-0073837 A | 6/2011 |

(Continued)

OTHER PUBLICATIONS

Extended European Search Report dated Nov. 28, 2017, of the corresponding European Patent Application No. 17192328.7.

(Continued)

Primary Examiner — Alix E Eggerding
(74) Attorney, Agent, or Firm — Lee IP Law, PC

(57) ABSTRACT

A rechargeable lithium battery includes tape, an electrode assembly, and a case housing the electrode assembly. The electrode assembly and the internal surfaces of the case are thermally adhered by the tape adhered to an external surface of the electrode assembly.

15 Claims, 3 Drawing Sheets

(56) References Cited

FOREIGN PATENT DOCUMENTS

KR    10-2012-0013877 A    2/2012
KR    10-2012-0097048 A    9/2012
WO    WO 2016/080143 A1    5/2016

OTHER PUBLICATIONS

A. Hammer et al., "Application Handbook Thermal Analysis of Polymers Selected Applications Thermal Analysis", 2013.
Office Action dated Jul. 12, 2019, of the corresponding European Patent Application No. 17192328.7.
Office Action dated Oct. 10, 2019, of the corresponding Chinese Patent Application No. 291710859445.9.

* cited by examiner

[FIG. 1]
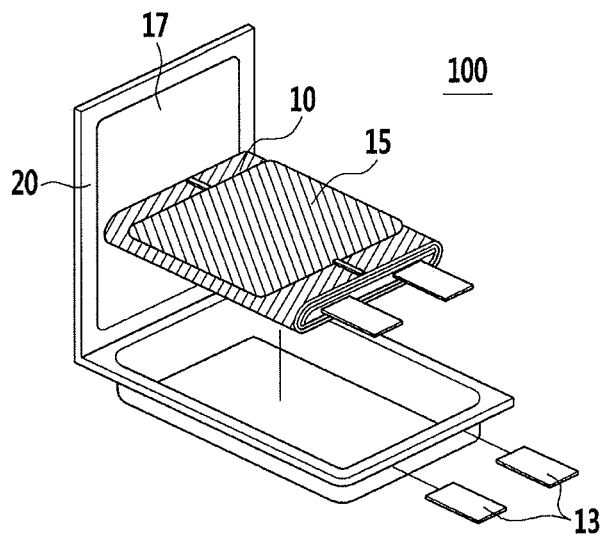
[FIG. 2]
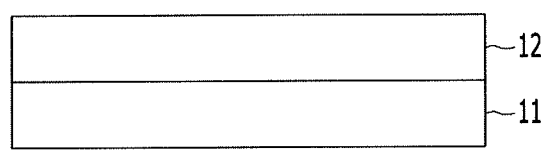
[FIG. 3]
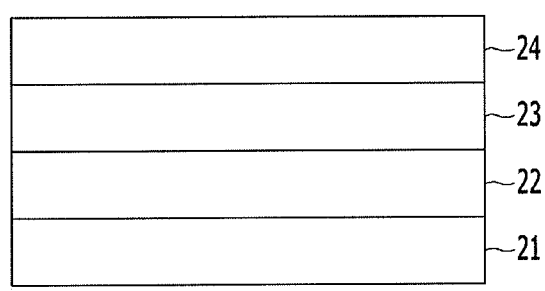

[FIG. 4]
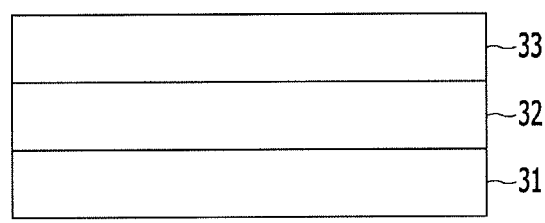
[FIG. 5]
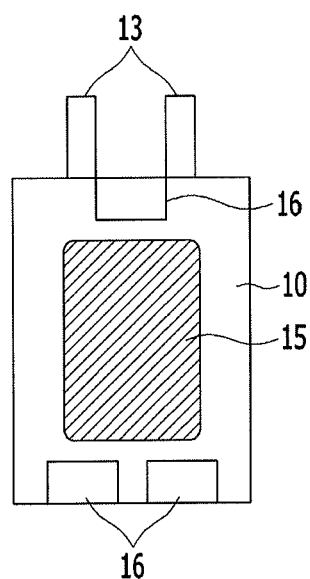

[FIG. 6]
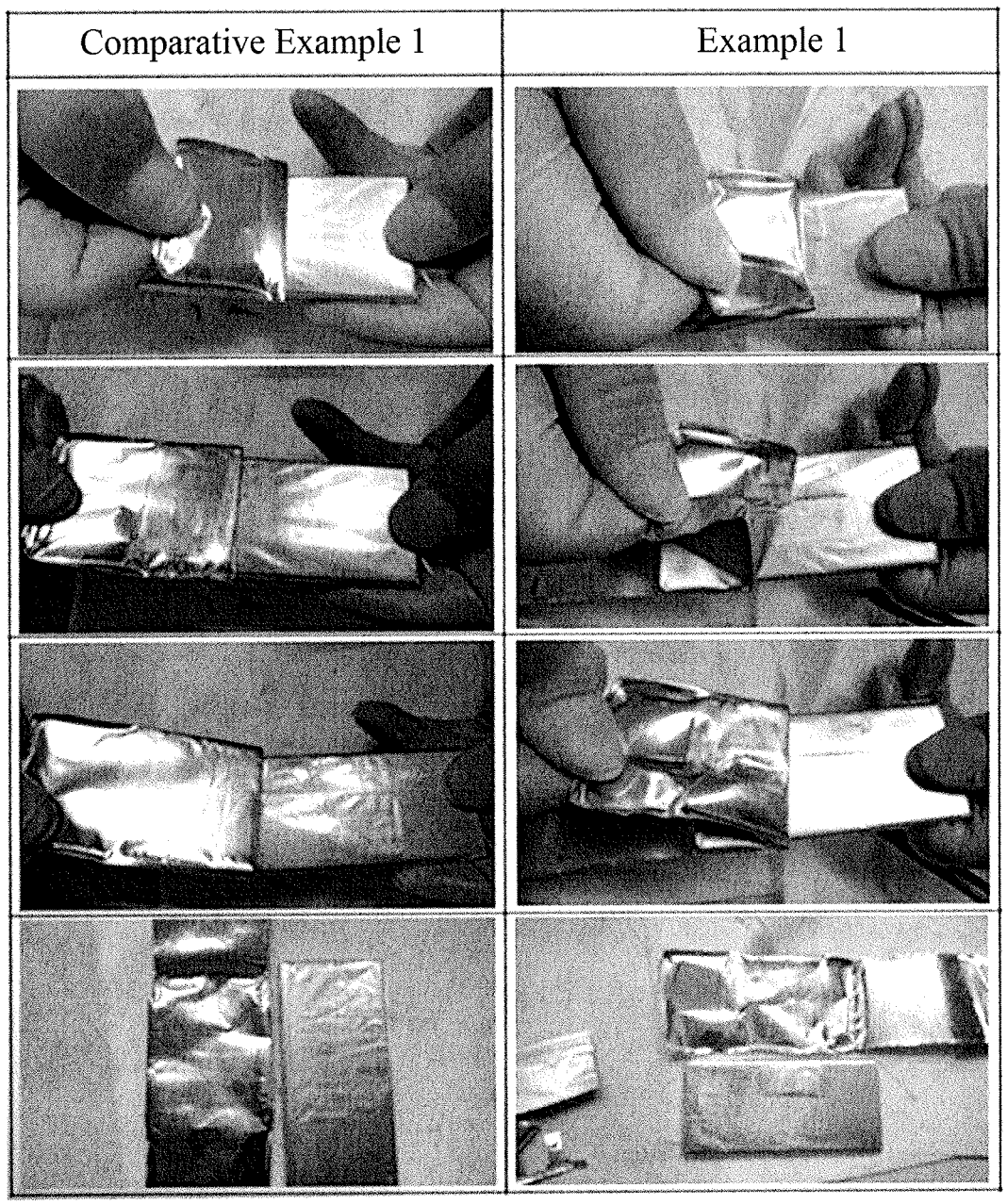

RECHARGEABLE LITHIUM BATTERY

CROSS-REFERENCE TO RELATED APPLICATION

Korean Patent Application No. 10-2016-0120643, filed on Sep. 21, 2016, and entitled, "Rechargeable Lithium Battery," is incorporated by reference herein in its entirety.

BACKGROUND

1. Field

One or more embodiments described herein relate to a rechargeable battery.

2. Description of the Related Art

A lithium polymer battery includes an electrode assembly in a sealed case containing an electrolyte solution. The electrode assembly may include a separator between positive and negative electrodes and may have a jelly-roll or other shape. A lithium polymer battery is susceptible to damage from external impact.

SUMMARY

In accordance with one or more other embodiments, a rechargeable lithium battery includes a tape; an electrode assembly; and a case housing the electrode assembly, wherein internal surfaces of the electrode assembly and the case are thermally adhered by the tape adhered to an external surface of the electrode assembly. The tape may include a polymer having a melting point of about 65° C. to about 100° C. The tape may include polyolefin. A thickness of the tape may range about 25 μm to about 55 μm.

A thermal shrinkage ratio of the tape in a machine direction (MD) and a transverse direction (TD) may be less than or equal to about 0%, and the thermal shrinkage ratio may be based on the following equation:

Thermal shrinkage ratio (%)=[(LO−L1)/LO]×100 where LO denotes an initial length of a tape and L1 denotes a length of a tape after being allowed to stand at 100° C. for 2 minutes. Adherence between the case and the tape may range from about 0.5 kgf/25 mm to about 1.5 kgf/25 mm. An adhesion strength of the tape may range from about 300 gf to about 800 gf. A tensile strength of the tape may range from about 400 kgf/cm$^2$ to about 700 kgf/cm$^2$. An elongation ratio of the tape may range from about 100% to about 750%.

The tape may include an adhesion layer having a first surface adhering to the electrode assembly, and a heat-bonding layer on a second surface of the adhesion layer and thermally bonded to an internal surface of the case. The heat-bonding layer may include a polymer having a melting point of about 65° C. to about 100° C. The adhesion layer may include at least one of an acryl-based adhesive and a hot-melt adhesive. A thickness of the heat-bonding layer may have a ratio of about 40% to about 90% relative to a total thickness of the tape.

The tape may include a first adhesion layer having a first surface adhered to the electrode assembly, a base layer on a second surface of the first adhesion layer, a second adhesion layer having a first surface adhered to the base layer, and a heat-bonding layer on a second surface of the second adhesion layer and thermally bonded to an internal surface of the case.

The first adhesion layer and the second adhesion layer may include at least one of an acryl-based adhesive and a hot-melt adhesive, respectively. The base layer may include a non-woven fabric, a polymer having a higher melting point than a polymer of the heat-bonding layer, or a combination thereof. The polymer may have a higher melting point than the polymer of the heat-bonding layer, and the polymer may include at least one of polyethylene terephthalate (PET), polybutylene terephthalate (PBT), polypropylene (PP), polyimide (PI), and a liquid crystalline polymer (LCP) resin.

The tape may include an outermost tape adhered to an upper or lower surface of the electrode assembly, or both. The tape may include a front tape attached on a first surface of the electrode assembly, a rear tape attached on a second surface of the electrode assembly, or a combination thereof, and the electrode assembly is thermally adhered to the internal surface of the case by the front tape, the rear tape, or the combination thereof.

BRIEF DESCRIPTION OF THE DRAWINGS

Features will become apparent to those of skill in the art by describing in detail exemplary embodiments with reference to the attached drawings in which:

FIG. 1 illustrates an embodiment of a rechargeable lithium battery;

FIG. 2 illustrates an embodiment of tape;

FIG. 3 illustrates another embodiment of tape;

FIG. 4 illustrates another embodiment of tape;

FIG. 5 illustrates another embodiment of a rechargeable lithium battery; and

FIG. 6 are photographs of various states of a disassembled rechargeable lithium battery cell according to an example embodiment and a disassembled rechargeable lithium battery cell of a comparative Example.

DETAILED DESCRIPTION

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

According to an embodiment, a rechargeable lithium battery has an integrated, one-body structure including a case housing an electrode assembly and thermally adhered tape between an internal surface of the case and an external surface of the electrode assembly. With this one-body structure, shrinkage of the electrode assembly from high temperatures or as a result of being in an electrolyte solution may be reduced or prevented. The appearance of defects may therefore be reduced. Also, movement of the electrode assembly in the case may be restrained or prevented. As a result, the rechargeable lithium battery may demonstrate strong resilience to external impact and battery stability may be improved.

FIG. 1 illustrates an embodiment of a rechargeable lithium battery 100 having a pouch-type structure. The rechargeable lithium battery may have a different structure in another embodiment.

Referring to FIG. 1, the rechargeable lithium battery 100 includes an electrode assembly 10, a tape 15 adhered to an external surface of the electrode assembly 10, a case 20 housing the electrode assembly 10, and an electrode tab 13 that provides an electrical path to externally draw currents generated in the electrode assembly 10. The case 20 is sealed by overlapping two sides facing each other. An electrolyte solution is injected inside the case 20 housing the electrode assembly 10.

The electrode assembly 10 includes a separator between a positive electrode facing a negative electrode. The positive electrode, the separator, and the negative electrode are sequentially wound to give the electrode assembly 10 may a jelly-roll shape. The electrode assembly 10 may have a different shape in another embodiment.

The electrode assembly 10 and the internal surface 17 of the case 20 may be thermally adhered by the tape 15, which is attached on the external surface of the electrode assembly 10. The tape 15 may be attached on the external surface of the electrode assembly 10, to thermally adhere the electrode assembly 10 to the internal surface 17 of the case 20. According to an embodiment, the tape 15 may include, for example, the same or a different material as the internal surface 17 of the case 20.

In one embodiment, the tape 15 may be made from a polymer having a low melting point, for example, a polymer having a melting point in a predetermined range, e.g., about 65° C. to about 100° C. Examples of such a polymer include polyolefin, polyurethane, and an ethylene vinylacetate (EVA) resin. The polyolefin may include, for example, polypropylene, polyethylene, or a combination thereof. The polyolefin may be, for example, elongated polyolefin, non-elongated polyolefin, or a combination thereof.

When a rechargeable lithium battery experiences external impact, the electrode assembly of the rechargeable lithium ion battery may transform from a jelly-roll shape to another undesired shape and/or movement of the electrode assembly may occur in the case. As a result, a short circuit may occur that has the effect of deteriorating performance of the battery. However, according to an embodiment, the tape of the rechargeable lithium battery is attached on the external surface of an electrode assembly. As a result, the electrode assembly of the rechargeable lithium battery 100 may maintain the jelly-roll shape (or other predetermined shape) and a position of the electrode assembly may be stabilized, even the battery receives external impact. Thus, a battery according to one or more embodiments may have protection against performance degradation.

In one embodiment, the tape 15 may be attached on an external surface finishing the jelly-roll-shaped electrode assembly 10. The tape 15 may be attached in a different manner, location, or surface in another embodiment.

In one embodiment, the tape 15 may include a front tape attached on one external surface finishing the electrode assembly 10, a rear tape attached on the other surface of the external surface finishing the electrode assembly 10, or a combination thereof. Accordingly, the electrode assembly 10 may be thermally adhered to one internal surface of the case 20 by the front tape, to the other internal surface of the case 20 by the rear tape, or to both of the internal surfaces of the case 20 by the front tape and the rear tape. In at least one embodiment, the tape may have a stack structure.

FIG. 2 illustrates an embodiment of a cross-sectional structure of a tape 15, which, for example, may correspond to the tape in the rechargeable lithium battery. Referring to FIG. 2, the tape 15 includes an adhesion layer 11 having one surface adhered to the electrode assembly 10 and a heat-bonding layer 12 on another surface of the adhesion layer 11 and thermally adhered to an internal surface 17 of the case 20.

The tape 15 including the heat-bonding layer 12 may be formed of a polymer with a low melting point as previously described, and may be attached on the internal surface 17 of the case 20. When such a tape 15 is used, movement of the electrode assembly in the case may be suppressed. This may impart stability when external impact occurs. Also, the tape 15 may also prevent the electrode assembly from shrinking at a high temperatures or in an electrolyte solution, and thus may control the appearance of defects in a battery.

In an embodiment, the thermal adhesion may be performed, for example, through a heat press at a predetermined temperature (e.g., at greater than or equal to about 60° C.) under a pressure of greater than or equal to about 100 kgf. In one embodiment, when a non-elongated polypropylene tape is included, the hot press may be performed at greater than or equal to about 100° C. under a pressure of greater than or equal to about 100 kgf. When a hot-melt resin tape is included, the hot-press may be performed at a predetermined temperature (e.g., at greater than or equal to about 60° C.) under a pressure of greater than or equal to about 100 kgf.

The tape 15 has adhesive property during the heat press, and accordingly may reinforce an adherence force between the electrode assembly 10 and the internal surface 17 of the case. As a result, movement of the electrode assembly in the case may be suppressed despite external impact. Also, stability of the wound jelly-roll shape of the electrode assembly may be maintained, even when external impact or another distorting event occurs. In addition, shrinkage of the electrode assembly may be restrained or prevented at high temperatures or as a result of being immersed in in an electrolyte solution. The appearance of defects in the battery may therefore be prevented.

FIG. 3 illustrates a cross-sectional structure of a tape 15a according to another embodiment, which tape may correspond to the tape in the rechargeable lithium battery. Referring to FIG. 3, the tape 15a includes a first adhesion layer 21 having a first surface adhered to the electrode assembly 10, a base layer 22 on a second surface of the first adhesion layer 21, a second adhesion layer 23 having a first surface adhered to the base layer 22, and a heat-bonding layer 24 on a second surface of the second adhesion layer 23 and thermally bonded to an internal surface 17 of the case 20.

FIG. 4 illustrates a cross-section structure of a tape 15b according to another embodiment, which tape may correspond to the tape in the rechargeable lithium battery.

Referring to FIG. 4, the tape 15b may include an adhesion layer 31 having a first surface adhered to the electrode assembly 10, a base layer 32 on a second surface of the adhesion layer 31, and a heat-bonding layer 33 on a surface of the base layer 32 and thermally bonded to an internal surface 17 of the case 20.

When tape having a stack structure as shown in FIGS. 2 to 4 is used to thermally adhere the electrode assembly to the internal surface of the case, movement the electrode assembly may be suppressed due to strong adherence of the electrode assembly to the case internal surface. Accordingly, the electrode assembly may exhibit strength against external impact (e.g., the battery falling or the like), and thus battery stability may be improved. In addition, shrinkage of the electrode assembly may be prevented at high temperatures or as a result of being immersed in an electrolyte solution. As a result, the appearance of defects in the battery may be reduced or minimized.

In the stack structure of the tape shown in FIGS. 2 to 4, a heat-bonding layer may be directly bonded to the internal surface of the case. The heat-bonding layer may include a polymer having a low melting point, e.g., a polymer having a melting point of about 65° C. to about 100° C. Examples of the polymer are the same as described above.

The adhesion layers 11 and 31, and the first adhesion layer 21 adhered to the electrode assembly in the stack structures shown in FIGS. 2 to 4 and the second adhesion layer 23 between the base layer 22 and the heat-bonding layer 24, in the stack structure of FIG. 3 may respectively include at least one of an acryl-based adhesive and a hot-melt adhesive.

When the adhesion layers 11 and 31 and the first adhesion layer 21 include the adhesive material, the electrode assembly may be externally well finished and is integrated with the case. Thus, stability against external impact may be achieved and the appearance of defects in the battery may be reduced or minimized.

In addition, in FIG. 3, when the second adhesion layer 23 is formed of the aforementioned material, adherence of the base layer 22 to the heat-bonding layer 24 may be reinforced. Accordingly, the electrode assembly may be integrated with the case. Thus, stability against external impact may be achieved and defects may be prevented.

In a stack structure of FIGS. 3 and 4, the base layers 22 and 32 may include, for example, a non-woven fabric, a polymer having a higher melting point than a polymer of the heat-bonding layer, or a combination thereof. The polymer having a higher melting point than the polymer of the heat-bonding layer may be, for example, polyethylene terephthalate (PET), polybutylene terephthalate (PBT), polypropylene(PP), polyimide (PI), a liquid crystalline polymer resin (LCP), or a combination thereof.

According to an embodiment, the base layers 22 and 32 may support the heat-bonding layers 24 and 33 and maintain their shapes when the heat-bonding layers 24 and 33 are converted to a molten state by heat. The base layers 22 and 32 may therefore suppress elongation of the tape in accordance with one or more embodiments. In addition, when the base layers 22 and 32 include the above material, adherence force of the first and second adhesion layers 21 and 23 may be reinforced. Accordingly, the electrode assembly and the case may be integrated and exhibit improved strength against external impact. Also, the existence of defects in the battery may be reduced or prevented.

According to an embodiment, the tape having a stack structure may have a thickness, for example, ranging from about 25 μm to about 55 μm. When the tape has a thickness within the range, the electrode assembly has excellent adherence to the internal surface of the case and may be exhibit stability against an external impact (e.g., when the battery is dropped, falls, or hit), and also may be prevented from a shrinking at high temperatures or as a result of being immersed in an electrolyte solution. As a result, battery defects may be further reduced or prevented.

The thickness of the heat-bonding layer may be in a predetermined range (e.g., about 40% to about 90%) based on a total thickness of the tape. When the heat-bonding layer has a thickness in this range, movement of the electrode assembly in the case may be suppressed, and stability against external impact may be realized. Also, shrinkage at high temperatures or as a result of being immersed in an electrolyte solution may be prevented. Also, the appearance battery defects may be prevented.

In one embodiment, the thermal shrinkage ratio of the tape may be determined based on Equation 1. The thermal shrinkage may be determined in a machine direction (MD) and a transverse direction (TD) according to Equation 1. This shrinkage may be, for example, less than or equal to about 0%. When the tape has a thermal shrinkage ratio within this range, excellent adherence may be obtained during the heat press. Also, shrinkage of the electrode assembly may be reduced or prevented at high temperatures or as a result of being immersed in an electrolyte solution may be realized.

$$\text{Thermal shrinkage ratio (\%)} = [(LO-L1)/LO] \times 100 \quad (1)$$

In Equation 1, LO denotes an initial length of a tape and L1 denotes a length of a tape after being allowed to stand at 100° C. for 2 minutes.

According to an embodiment, an adherence force of the case to the tape may be in a range of about 0.5 kgf/25 mm to about 1.5 kgf/25 mm. When the adherence force is in this range, the electrode assembly may be effectively suppressed from movement in the battery case.

In one embodiment, adhesion strength of the tape may range from about 300 gf to about 800 gf. When the adhesion strength is in this range, an excellent adherence force may be obtained during the heat press.

The tensile strength of the tape may range, for example, from about 400 kgf/cm$^2$ to about 700 kgf/cm$^2$. When the tensile strength is within the range, an excellent adherence force may be obtained during the heat press.

An elongation ratio of the tape may range, for example, from about 100% to about 750%. When the elongation ratio is within the range, an excellent adherence force may be obtained during the heat press.

FIG. 5 illustrates another embodiment of a rechargeable lithium battery, and more specifically an example of a top plan view of the rechargeable lithium battery including an electrode assembly.

Referring to FIG. 5, the electrode assembly 10 may further include an outermost tape 16 attached on the upper surface and/or the lower surface of the electrode assembly 10. According to an embodiment, the outermost tape 16 may be an insulation tape on the upper surface and/or the lower surface of the electrode assembly, for example, bent and attached along a partial or whole edge of the electrode assembly 10.

In addition, the outermost tape 16 may overlap the tape (e.g., 15, 15a, or 15b) on the external surface of the electrode assembly 10. The outermost tape 16 may further reinforce stability of the pouch-type rechargeable battery.

The outermost tape 16 of FIG. 5 may be attached, for example, in a predetermined distance between tabs 13 on the upper surface of the electrode assembly 10, and on the lower surface of the electrode assembly 10 with predetermined intervals, to finish upper and lower exposed regions. The outermost tape 16 may be attached in a different manner in another embodiment.

According to an embodiment, the positive electrode of the electrode assembly includes a current collector and a positive active material layer on the current collector. The positive active material layer may include, for example, a positive active material, a binder, and an option conductive material. The current collector may include Al (aluminum) or another conductive material.

The positive active material may include, for example, lithiated intercalation compounds that reversibly intercalate and deintercalate lithium ions. For example, at least one composite oxide of lithium and a metal of cobalt, manganese, nickel, or a combination thereof may be used. Examples thereof may be a compound represented by one of the following Chemical Formulae:

$Li_aA_{1-b}B_bD_2$ (wherein, in the chemical formula, $0.90 \leq a \leq 1.8$ and $0 \leq b \leq 0.5$); $Li_aE_{1-b}B_bO_{2-c}D_c$ (wherein, in the chemical formula, $0.90 \leq a \leq 1.8$, $0 \leq b \leq 0.5$, $0 \leq c \leq 0.05$); $LiE_{2-b}B_bO_{4-c}D_c$ (wherein, in the chemical formula, $0 \leq b \leq 0.5$, $0 \leq c \leq 0.05$); $Li_aNi_{1-b-c}Co_bB_cD_\alpha$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}F_\alpha$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}F_2$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cD_\alpha$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}F_\alpha$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}F_2$ (wherein, in the chemical formula, $0.90 \leq a \leq 1.8$, $0 \leq b \leq 0.5$, $0 \leq c \leq 0.05$, $0 \leq \alpha \leq 2$); $Li_aNi_bE_cG_dO_2$ (wherein, in the chemical formula, $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (wherein, in the chemical formula, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (wherein, in the chemical formula, $0.90 \leq a \leq 1.8$, $0.001 \leq b \leq 0.1$); $Li_aCoG_bO_2$ (wherein, in the chemical formula, $0.90 \leq a \leq 1.8$, $0.001 \leq b \leq 0.1$); $Li_aMnG_bO_2$ (wherein, in the chemical formula, $0.90 \leq a \leq 1.8$, $0.001 \leq b \leq 0.1$); $Li_aMn_2G_bO_4$ (wherein, in the chemical formula, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In these chemical formulae, A is Ni, Co, Mn, or a combination thereof; B is Al, Ni, Co, Mn, Cr, Fe, Mg, Sr, V, a rare earth element, or a combination thereof D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds may have a coating layer on the surface or may be mixed with another compound having a coating layer. The coating layer may include, for example, at least one of an oxide of a coating element, a hydroxide of a coating element, an oxyhydroxide of a coating element, an oxycarbonate of a coating element, and a hydroxyl carbonate of a coating element. The compound of the coating layer may be, for example, amorphous or crystalline. The coating element of the coating layer may include, for example, Mg, Al, Co, K, Na, Ca, Si, Ti, V, Sn, Ge, Ga, B, As, Zr, or a mixture thereof. The coating layer may be disposed in a method, for example, which has no adverse influence on properties of a positive active material using these elements in the compound. For example, the method may include any coating method such as spray coating, dipping, or another method.

The binder improves binding properties of positive active material particles with one another and with a current collector. Examples include polyvinyl alcohol, carboxylmethyl cellulose, hydroxypropyl cellulose, diacetyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Various electrically conductive materials may be used, unless, for example, the material causes a chemical change. Examples of the conductive material may be, for example, natural graphite, artificial graphite, carbon black, acetylene black, ketjen black, a carbon fiber, a metal powder or a metal fiber of copper, nickel, aluminum, silver, and the like, a conductive polymer such as a polyphenylene derivative, or a mixture thereof.

The negative electrode of the electrode assembly includes a negative current collector and a negative active material layer on the negative current collector. The negative current collector may use, for example, a copper foil. The negative active material layer includes a negative active material, a binder, and an option conductive material. The negative active material includes a material that reversibly intercalates/deintercalates lithium ions, a lithium metal, lithium metal alloy, a material being capable of doping and dedoping lithium, or a transition metal oxide.

The material that reversibly intercalates/deintercalates lithium ions includes a carbon material. The carbon material may be any generally-used carbon-based negative active material in a lithium ion rechargeable battery. Examples of the carbon material include but are not limited to crystalline carbon, amorphous carbon, and mixtures thereof. The crystalline carbon may be non-shaped, or sheet, flake, spherical, or fiber shaped natural graphite or artificial graphite. The amorphous carbon may be soft carbon (carbon fired at low temperature) or hard carbon, a mesophase pitch carbonized product, fired coke, and the like. The lithium metal alloy include lithium and at least one element such as but not limited to Na, K, Rb, Cs, Fr, Be, Mg, Ca, Sr, Si, Sb, Pb, In, Zn, Ba, Ra, Ge, Al, and Sn.

The material being for doping and dedoping lithium may include Si, $SiO_x$ ($0<x<2$), a Si—C composite, a Si—Y alloy (wherein Y is an element selected from an alkali metal, an alkaline-earth metal, Groups 13 to 16 elements, a transition metal, a rare earth element, and a combination thereof, and not Si), Sn, $SnO_2$, Sn—C composite, Sn—Y alloy, where Y is, for example, an alkali metal, an alkaline-earth metal, Groups 13 to 16 elements, a transition metal, a rare earth element, and a combination thereof and not Sn. At least one of these materials may be mixed, for example, with $SiO_2$ or another oxide or material. Examples of Y include but are not limited to Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combination thereof.

The transition metal oxide may include, for example, a vanadium oxide, a lithium vanadium oxide, and the like.

The binder improves binding properties of negative active material particles with one another and with a current collector. Examples thereof include but are not limited to polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Various electrically conductive materials may be used, unless, for example, it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode and the positive electrode may be respectively manufactured, for example, by mixing each active material, a conductive material and a binder in a solvent to prepare an active material composition, and coating the composition on a current collector. Various electrode manufacturing methods may be used. The solvent includes, for example, N-methylpyrrolidone.

An electrolyte solution may be injected into the inside of the case housing the electrode assembly. The electrolyte solution includes, for example, an organic solvent and a lithium salt. The organic solvent serves as a medium for transmitting ions taking part in the electrochemical reaction of a battery.

The organic solvent may be, for example, a carbonate-based, ester-based, ether-based, ketone-based, alcohol-based, and aprotic solvent. The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

When the chain carbonate compounds and cyclic carbonate compounds are mixed, an organic solvent having a high dielectric constant and a low viscosity may be provided. The cyclic carbonate compound and the chain carbonate compound are mixed together in a volume ratio ranging, for example, from about 1:1 to about 1:9.

Examples of the ester-based solvent are methylacetate, ethylacetate, n-propylacetate, t-butylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like, and examples of the ketone-based solvent may be cyclohexanone, and the like Examples of the alcohol-based solvent may be ethanol, isopropyl alcohol, and the like.

The organic solvent may be used singularly or in a mixture of two or more. When the organic solvent is used in a mixture of two or more, the mixture ratio may be controlled in accordance with a desirable cell performance.

The electrolyte solution may further include an overcharge-inhibiting additive such as ethylene carbonate, pyrocarbonate, and like.

The lithium salt is dissolved in an organic solvent, supplies lithium ions in a battery, may serve to promote operation of the rechargeable lithium battery, and improves lithium ion transportation between positive and negative electrodes therein. Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB), or a combination thereof.

The lithium salt may be used in a concentration ranging, for example, from about 0.1 M to about 2.0 M. When the lithium salt is in the above concentration range, an electrolyte may have excellent performance and lithium ion mobility due to optimal electrolyte conductivity and viscosity.

The separator of the electrode assembly may be any generally-used separator in a lithium battery which separates a negative electrode and a positive electrode and provides a transporting passage for lithium ions. In one embodiment, the separator may have a predetermined low resistance to ion transport and excellent impregnation for an electrolyte solution. Examples for making the separator include glass fiber, polyester, polyethylene, polypropylene, polytetrafluoroethylene (PTFE), or a combination thereof. In one embodiment, the separator may be a non-woven fabric or a woven fabric. For example, a polyolefin-based polymer separator such as polyethylene and polypropylene may be used for the lithium ion battery. In order to ensure the heat resistance or mechanical strength, a coated separator including a ceramic component or a polymer material may be used. In one embodiment, the coated separator may have a monolayered or multi-layered structure.

The following Examples and Comparative Examples are provided in order to highlight characteristics of one or more embodiments. It will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

A positive active material layer composition was prepared by mixing $LiCoO_2$, polyvinylidene fluoride (PVDF), and carbon black in a weight ratio of 97:1.5:1.5 and dispersing the mixture in N-methyl-2-pyrrolidone. The positive active material layer composition was coated on a 12 μm-thick aluminum foil and then, dried and compressed to manufacture a positive electrode.

A negative active material layer composition was prepared by mixing graphite and styrene-butadiene rubber in a weight ratio of 98:2 and dispersing the mixture in water. The negative active material layer composition was coated on a 8 μm-thick copper foil and then, dried and compressed to manufacture a negative electrode.

An electrolyte solution was prepared by mixing ethylene carbonate (EC), propylene carbonate (PC), EMC, and DEC in a ratio of 25:5:40:30 and dissolving $LiPF_6$ in a concentration of 1.3 M in the mixed solvent.

The positive and negative electrodes were wound with a polyethylene separator to manufacture a jelly roll-shaped electrode assembly.

A double-layered tape was attached on the external surface of the electrode assembly. The double-layered tape included an acryl-based adhesion layer and a heat-bonding layer formed of elongated polypropylene (casted polypropylene, CPP) having a melting point of 85° C. (Daeyhun ST Co., Ltd.) on the adhesion layer. The tape was 25 μm thick in total, where the adhesion layer was 5 μm thick and the heat-bonding layer was 20 μm thick.

The electrode assembly finished with the double-layered tape was housed in a pouch case. Then, the case was sealed after inserting the electrolyte solution into the case and heat-pressed at 120° C. under 100 kgf for about 3 seconds to manufacture a rechargeable lithium battery cell.

EXAMPLE 2

A rechargeable lithium battery cell was manufactured according to the same method as Example 1, except for using a four-layered tape instead of the double-layered tape. The four-layered tape included a 5 μm-thick first adhesion layer formed of acryl-based rubber, a 7 μm-thick base layer formed of polyethylene terephthalate (PET) on the first adhesion layer, a 5 μm-thick second adhesion layer formed of acryl-based rubber on the base layer, and a 20 μm-thick heat-bonding layer formed of casted polypropylene on the second adhesion layer.

EXAMPLE 3

A rechargeable lithium battery cell was manufactured according to the same method as Example 1, except for using tape including a 5 μm-thick adhesion layer formed of acryl-based rubber and a 50 μm-thick heat-bonding layer formed of a hot-melt having a melting point of 65° C.-75° C. (Tapex Pty. Ltd.). The electrode assembly was finished with the double-layered tape was housed in a pouch case, and then the pouch case was sealed after inserting the electrolyte solution thereinto and heat-pressed at 65° C. under 100 kgf for about 3 seconds to make a rechargeable lithium battery cell.

EXAMPLE 4

A rechargeable lithium battery cell was manufactured according to the same method as Example 3, except for using a three-layered tape instead of the double-layered tape. The three-layered tape included a 5 μm-thick adhesion layer formed of acryl-based rubber, a 25 μm-thick base layer formed of elongated polypropylene (Oriented Polypropylene, OPP) on the adhesion layer, and a 20 μm-thick heat-bonding layer formed of a hot-melt (Tapex Pty Ltd.) on the base layer.

COMPARATIVE EXAMPLE 1

The positive and negative electrodes according to Example 1 were wound with a polyethylene separator to manufacture a jelly roll-shaped electrode assembly. An elongated polystyrene (oriented polystyrene, OPS) film (Tapex Pty. Ltd.) was attached on the external surface of the electrode assembly. The OPS film had a melting point of 80° C. and was 56 μm thick. The electrode assembly finished with the elongated polystyrene film was inserted into a pouch case. Then, the pouch case was sealed after injecting the electrolyte solution into the case to manufacture a rechargeable lithium battery cell.

EVALUATION 1: PROPERTIES OF TAPE

Properties of each tape according to Examples 1 to 4 and Comparative Example 1 were measured and the results are shown in Table 1.

[1] Measurement of Thermal Shrinkage Ratio
Each thermal shrinkage ratio in a machine direction (MD) and a transverse direction (TD) was calculated according to the following equation:

Thermal shrinkage ratio (%)=[($LO$–$L1$)/$LO$]×100, where LO denotes an initial length of a tape, and L1 denotes a length of the tape after allowed to stand at 100° C. for 2 minutes.

[2] Adherence force Measurement of Case and Tape
The rechargeable lithium battery cells respectively adhered by the tapes according to Examples 1 to 4 and Comparative Example 1 were disassembled, and an adherence force of the tapes was measured through a push-pull gauge. The adherence force was measured by respectively fixing the disassembled pouch cases on a jig. After about 3 mm of pulling the Al substrates (performed by hanging Al substrates in the push-pull gage), shear adhesive strength values and the width adhered between the pouch cases and the Al substrates were then respectively measured. (The adherence force (kgf/mm) was obtained by respectively dividing the shear adhesive strength values measured after hanging the Al substrates in the push-pull gauge and about 3 mm pulling them with the widths adhered between the pouch cases and the Al substrates).

[3] Measurement of Adhesion Strength
Each tape according to Examples 1 to 4 and Comparative Example 1 was adhered on a SUS plate, compressed by reciprocating a 2 kg roller at a speed of 300 mm/min, and allowed to stand under an isothermal-isohumidity condition (23° C., 50% RH) for 20 minutes. Then, adhesion strength was measured at a peeling speed of 300 mm/min and a peeling angle of 180° by using a universal test machine (UTM).

[4] Measurement of Tensile Strength and Elongation Ratio
Tensile strength was measured by respectively making the tapes of Examples 1 to 4 and Comparative Example 1 into 10 mm*200 mm tensile strength specimens and using the universal test machine (UTM) at room temperature according to ASTM D-638. The universal test machine was set at a cross-head speed of 300 mm/min, and the gauge was set to have a length of 100 mm. The tensile strength is 10 P/W*t, where P indicates a stress (kgf) when broken, W indicates width of a specimen (mm), and t indicates thickness (mm) of the specimen.

An elongation ratio was measured by manufacturing specimens in the same method as manufacturing the specimens for measuring the tensile strength. The specimens were used to measure the elongation ratio by using the UTM equipment. The elongation ratio (%) is expressed by 1-$l_0$/1*100, wherein $l_0$ indicates an initial distance between jigs, and 1 indicates a distance between the jigs after cutting.

TABLE 1

|  |  | Example 1 | Example 2 | Example 3 | Example 4 | Comparative Example 1 |
|---|---|---|---|---|---|---|
| Thermal shrinkage ratio (%) | TD | 0 | 0 | 0 | 0 | 76 |
|  | MD | 0 | 0 | 0 | 0 | 10 |
| Adherence between case and tape (kgf) |  | 1 | 1 | 1 | 0.6 | 0.4 |

TABLE 1-continued

|  | Example 1 | Example 2 | Example 3 | Example 4 | Comparative Example 1 |
|---|---|---|---|---|---|
| Adhesion strength (gf) | 700 | 700 | 500 | 500 | 700 |
| Tensile strength (kgf/cm²) | 400-450 | — | — | 618 | 936 |
| Elongation ratio (%) | 440-500 | — | — | 151 | 76 |

Referring to Table 1, the tapes used to finish the electrode assemblies in Example 1 to 4 showed a less thermal shrinkage, but a stronger adherence force, to the case than the elongated polystyrene film used in Comparative Example 1. Accordingly, a tape having these properties may prevent a shrinkage of an electrode assembly at high temperature or when immersed in an electrolyte solution, and thus may prevent the appearance of defects in a battery cell.

EVALUATION 2: ADHERENCE FORCE EVALUATION OF RECHARGEABLE LITHIUM BATTERY CELL AT DISASSEMBLY

The rechargeable lithium battery cells according to Example 1 and Comparative Example 1 were disassembled as shown in FIG. 6.

FIG. 6 illustrates a series of photographs of the disassembled rechargeable lithium battery cells according to Example 1 and Comparative Example 1. The photograph show, for example, each adherence force between the electrode assemblies and the internal surface of the cases according to Example 1 and Comparative Example 1. Example 1 showed a stronger adherence force between the electrode assembly and the internal surface of the case than Comparative Example 1. Accordingly, movement of an electrode assembly in the case of a rechargeable lithium battery cell according to an embodiment may be suppressed and exhibit improved strength against external impact.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A rechargeable lithium battery, comprising:
   a tape;
   an electrode assembly; and
   a case housing the electrode assembly,
   wherein the electrode assembly and internal surfaces of the case are thermally adhered by the tape adhered to an external surface of the electrode assembly, and
   wherein the tape includes:
      a first adhesion layer having a first surface adhered to the electrode assembly,
      a base layer on a second surface of the first adhesion layer,
      a second adhesion layer having a first surface adhered to the base layer, and
      a heat-bonding layer on a second surface of the second adhesion layer and thermally bonded to an internal surface of the case.

2. The rechargeable lithium battery as claimed in claim 1, wherein the heat-bonding layer includes a polymer having a melting point of about 65° C. to about 100° C.

3. The rechargeable lithium battery as claimed in claim 1, wherein the heat-bonding layer includes polyolefin.

4. The rechargeable lithium battery as claimed in claim 1, wherein a thickness of the tape ranges about 25 μm to about 55 μm.

5. The rechargeable lithium battery as claimed in claim 1, wherein:
   a thermal shrinkage ratio of the tape in a machine direction (MD) and a transverse direction (TD) is less than or equal to about 0%, and
   the thermal shrinkage ratio is based on the following equation:

Thermal shrinkage ratio (%)=[(LO−L1)/LO]×100 where LO denotes an initial length of a tape and L1 denotes a length of a tape after being allowed to stand at 100° C. for 2 minutes.

6. The rechargeable lithium battery as claimed in claim 1, wherein adherence between the case and the tape ranges from about 0.5 kgf/25 mm to about 1.5 kgf/25 mm.

7. The rechargeable lithium battery as claimed in claim 1, wherein an adhesion strength of the tape ranges from about 300 gf to about 800 gf.

8. The rechargeable lithium battery as claimed in claim 1, wherein a tensile strength of the tape ranges from about 400 kgf/cm² to about 700 kgf/cm².

9. The rechargeable lithium battery as claimed in claim 1, wherein an elongation ratio of the tape ranges from about 100% to about 750%.

10. The rechargeable lithium battery as claimed in claim 1, wherein a thickness of the heat-bonding layer has a ratio of about 40% to about 90% relative to a total thickness of the tape.

11. The rechargeable lithium battery as claimed in claim 1, wherein the first adhesion layer and the second adhesion layer each include at least one of an acryl-based adhesive and a hot-melt adhesive.

12. The rechargeable lithium battery as claimed in claim 1, wherein the base layer includes a non-woven fabric, a polymer having a higher melting point than a polymer of the heat-bonding layer, or a combination thereof.

13. The rechargeable lithium battery as claimed in claim 12, wherein:
   the polymer has a higher melting point than the polymer of the heat-bonding layer, and
   the polymer includes at least one of polyethylene terephthalate (PET), polybutylene terephthalate (PBT), polypropylene (PP), polyimide (PI), and a liquid crystalline polymer (LCP) resin.

14. The rechargeable lithium battery as claimed in claim 1, wherein the tape includes an outermost tape adhered to an upper or lower surface of the electrode assembly, or both.

15. The rechargeable lithium battery as claimed in claim 1, wherein:
- the tape includes a front tape attached on a first surface of the electrode assembly, a rear tape attached on a second surface of the electrode assembly, or a combination thereof, and
- the electrode assembly is thermally adhered to the internal surface of the case by the front tape, the rear tape, or the combination thereof.

* * * * *